United States Patent [19]

Fujiki et al.

[11] 4,238,809
[45] Dec. 9, 1980

[54] SERVO TRACK CONFIGURATION FOR MAGNETIC DISK APPARATUS

[75] Inventors: Masao Fujiki, Hamura; Hiromi Hamaoka, Tokyo; Toshiaki Hattori, Ome, all of Japan

[73] Assignee: Tokyo Shibaura Denki Kabushiki Kaisha, Japan

[21] Appl. No.: 17,618

[22] Filed: Mar. 5, 1979

[30] Foreign Application Priority Data

Mar. 9, 1978 [JP] Japan ................................. 53-25996

[51] Int. Cl.² .......................... G11B 5/74; G11B 5/82; G11B 21/10
[52] U.S. Cl. .................................... 360/131; 360/135; 360/77
[58] Field of Search .............................. 360/131–136, 360/77, 78, 75

[56] References Cited

U.S. PATENT DOCUMENTS

| 3,534,344 | 10/1970 | Santana | 360/77 |
| 3,691,543 | 9/1972 | Mueller | 360/77 |
| 4,068,267 | 1/1978 | Inouye | 360/77 |
| 4,068,269 | 1/1978 | Commander et al. | 360/77 |
| 4,163,265 | 7/1979 | Van Herk et al. | 360/77 |

Primary Examiner—Robert S. Tupper
Attorney, Agent, or Firm—Finnegan, Henderson, Farabow, Garrett & Dunner

[57] ABSTRACT

A servo track apparatus comprising at least one unit pattern area including $2n$ ($n=2, 3, 4, \ldots$) servo tracks $T_i$ ($i=0, 1, \ldots 2n-1$) and $2n^2$ flux transitions $R_{jk}$ ($j=0, 1, \ldots 2n-1$; $k=0, 1, \ldots n-1$). The tracks and flux transitions satisfy a condition TT requiring that track $T_p$ be adjacent to track $T_{p+1}$; a condition TR requiring that transition $R_{pq}$ occur on track $T_{p+q}$ (mod $2n$); a condition RR requiring that transitions $R_{pq}$ and $R_{pr}$ ($r \neq q$) have the same polarity and occur at the same position; and a condition $\overline{RR}$ requiring that transitions $R_{pr}$ and $R_{qr}$ ($q \neq p$) occur at different positions.

5 Claims, 31 Drawing Figures b'c'd'e'f'g'h' a b c d e f g h a"b"c"d"e"f"g"h"

FIG. 5H  HIGH  LOW

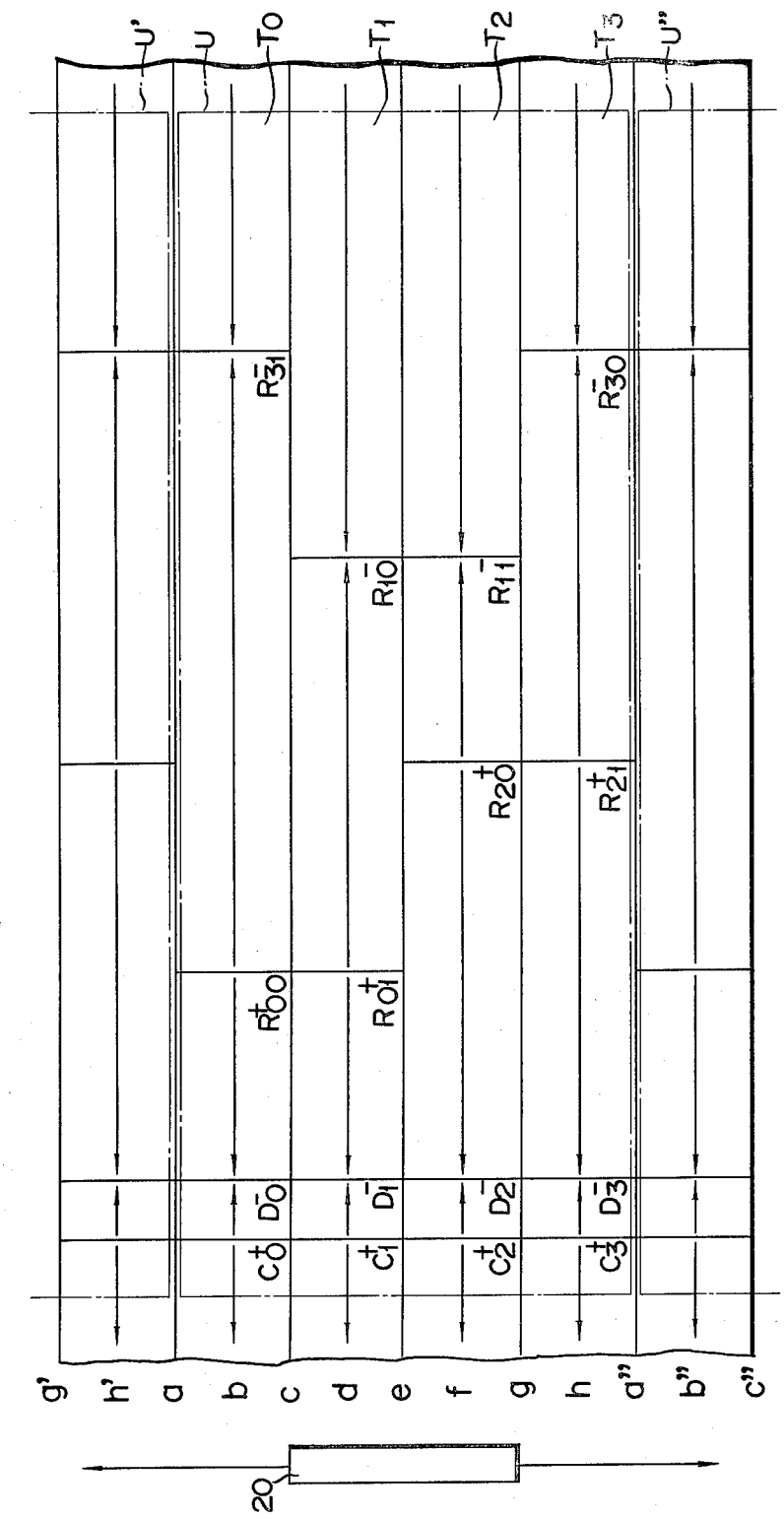

SERVO TRACK CONFIGURATION FOR MAGNETIC DISK APPARATUS

BACKGROUND OF THE INVENTION

This invention relates to a novel and improved servo track configuration for magnetic disk apparatus.

In a magnetic disk apparatus employing a positioning servo system for positioning a read/write head relative to a desired data track of a magnetic disk, it is necessary to provide servo information which indicates the precise position of the read/write head. Suitable means for providing such servo information are employed in the servo track apparatus and the associated demodulator as disclosed in U.S. Pat. No. 3,534,344 to George R. Santana, "Method and Apparatus for Recording and Detecting Information" issued Oct. 13, 1970, and in U.S. Pat. No. 3,691,543 to Francis E. Mueller, "Positioning System including Servo Track Configuration and Associated Demodulator" issued Sept. 12, 1972.

The servo information provided by the above-mentioned two systems in the form of periodic position signals, however, can hardly show whether the read/write head is approaching from a desired data track to an adjacent data track or is approaching to the desired data track after having left the desired data track. For this reason, the known magnetic disk apparatus employs a velocity detector for providing additional servo information which indicates both velocity and direction in which the read/write head is moving.

SUMMARY OF THE INVENTION

It is an object of this invention to provide a novel and improved servo track apparatus which cooperates with an associated demodulator to provide not only first servo information indicating the position of a read/write head but also second servo information indicating both velocity and direction in which the read/write head is moving.

According to this invention, a servo track apparatus comprises a movable magnetizable surface having at least one unit pattern area, the apparatus $2n$ ($n=2, 3, 4, \ldots$) servo tracks $T_i$ ($i=0, 1, 2, \ldots 2n-1$) positioned on the surface in said area; and $2n^2$ flux transitions $R_{jk}$ ($j=0, 1, 2, \ldots 2n-1$; $k=0, 1, 2, \ldots n-1$) contained in the tracks the servo tracks and flux transitions satisfying the following four conditions:

Condition TT: Track $T_p$ is adjacent to track $T_{p+1}$.
Condition TR: Transition $R_{pq}$ occurs on track $T_{p+q(mod\ 2n)}$.
Condition RR: Transitions $R_{pq}$ and $R_{pr}$ ($r \neq q$) have the same polarity and occur at the same position.
Condition $\overline{RR}$: Transitions $R_{pr}$ and $R_{qr}$ ($q \neq p$) occur at different positions.

BRIEF DESCRIPTION OF THE DRAWINGS

FIGS. 5A to 5I illustrate the relationship between the position of the servo head and the voltage of the output signals of the elements constituting the demodulator shown in FIG. 4;

FIGS. 9 to 11 shows other embodiments of this invention.

DETAILED DESCRIPTION OF THE PREFERRED EMBODIMENTS

Figure 1:
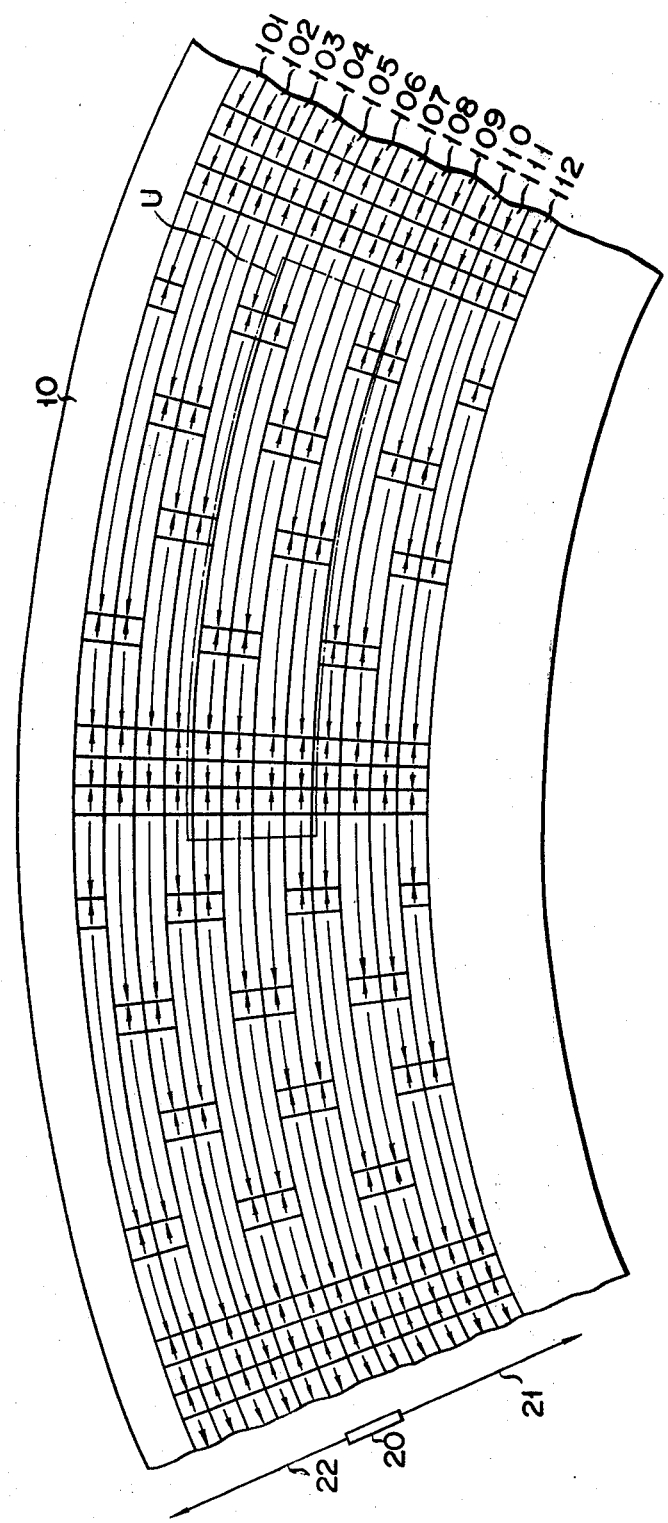
FIG. 1 shows the surface of a servo disk using a servo track configuration according to this invention.

Now referring to FIGS. 1 and 2, an embodiment of this invention will be described. FIG. 1 shows the surface of a servo disc 10 using a servo track configuration according to this invention. As shown in FIG. 1, the servo disk 10 has 12 concentric servo tracks 101 to 112 and is rotated counter-clockwise, i.e. in the direction of arrow 11. The servo tracks 101 to 112 have the same width and are arranged toward the center of the disk 10 in numerical order. Each servo track consists of a plurality of regions, each magnetized in the direction of the arrow shown within the track. Any adjacent two regions of each servo track are magnetized in opposite directions. A reversal or transition of magnetic flux therefore exists, forming a border between the adjacent two regions. Here it is determined that the transition between the tails of adjacent arrows have a positive polarity and that the transition between the heads of adjacent arrows have a negative polarity.

A read/write head (not shown) and a servo transducer or servo head 20 are attached to a head-positioning device (not shown) and are movable in the radial direction of the disc 10, toward or away from the center of the disc 10. The servo head 20 has a core the width of which is about twice the width of a servo track.

Figure 2:
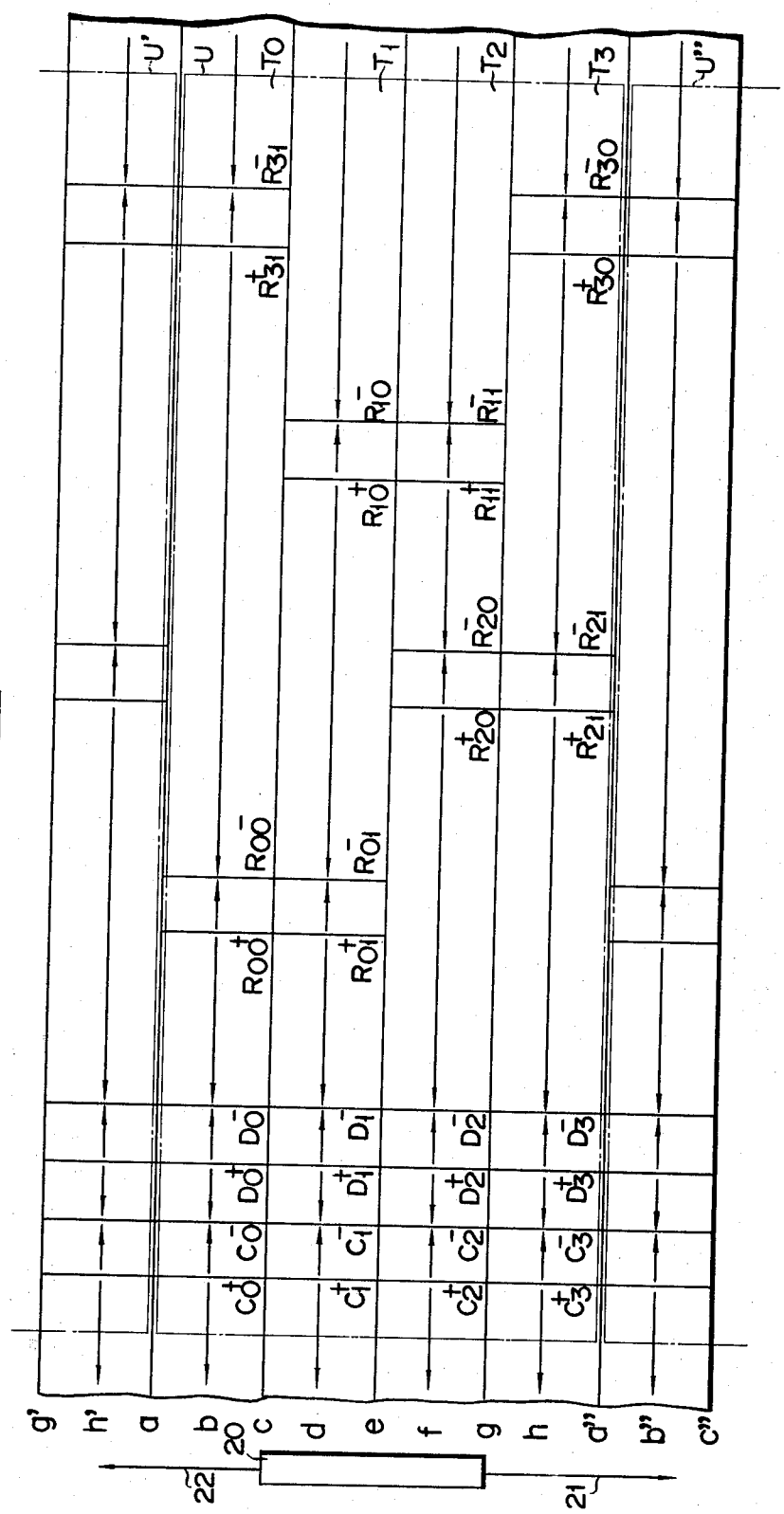
FIG. 2 is an enlarged view of a unit pattern area U of the servo track configuration shown in FIG. 1, wherein the servo tracks are illustrated as non-curving and two unit pattern areas U' and U" adjacent to the area U are partially illustrated.

FIG. 2 shows the servo track configuration of FIG. 1 in more detail and illustrates the servo tracks as if linear (non-curving). What is encircled with a dot-dash line in FIG. 2 is a unit area U of the servo track configuration and thus will hereinafter be called "unit pattern area." The unit pattern area U includes four servo tracks $T_i$ ($i = 0, 1, 2$ and 3) and 32 flux transitions $C+_j$, $C-_j$, $D+_j$, and $D-_j$ ($j=0, 1, 2$ and 3) and $R+_{jk}$ and $R-_{jk}$ ($j=0, 1, 2$ and 3; $k=0$ and 1). Transitions $C+_j$, $D+_j$ and $R+_{jk}$ are positive, and transitions $C-_j$, $D-_j$ and $R-_j$ are negative. The tracks and the transitions are arranged so as to satisfy the following conditions:

Condition TT: Track $T_p$ is adjacent to track $T_{p+1}$.
Condition TR+: Transition $R+_{pq}$ occurs on track $T_{p+q}$ (mod 4) (see note 1 below).
Condition TR−: Transition $R-_{pq}$ occurs on track $T_{p+q}$ (mod 4).
Condition TC+: Transition $C+_p$ occurs on track $T_p$.
Condition TC−: Transition $C-_p$ occurs on track $T_p$.
Condition CC+: Transition $C+_p$ occurs at the same position as does transition $C+_q$ ($q \neq p$).
Condition CC−: Transition $C-_p$ occurs at the same position as does transition $C-_q$ ($q \neq p$).
Condition TD+: Transition $D+_p$ occurs on track $T_p$.
Condition TD−: Transition $D-_p$ occurs on track $T_p$.
Condition DD+: Transition $D+_p$ occurs at the same position as does transition $D+_p$ ($q \neq p$).

Condition DD⁻: Transition $D_{-p}$ occurs at the same position as does transition $D_{-q}$ (q≠p).

Condition RR+: Only transition $R_{+pq}$ (q≠r) occurs at the same position as does transition $R_{+pr}$.

Condition RR⁻: Only transition $R_{-pq}$ (q≠r) occurs at the same position as does transition $R_{-pr}$.

Condition ODR: Transitions $C_{+j}$, $C_{-j}$, $D_{+j}$, $D_{-j}$, $R_{0k}$, $R_{2k}$, $R_{1k}$ and $R_{3k}$ in this order.

Note 1: "p+q (mod 4)" means addition as shown in the following table, wherein "4" is modulus.

Note 2: Condition "transition A occurs at the same position as does transition B" means that when the servo disk 10 is not moving and the servo head 20 is facing transition A, the servo head 20 will reach transition B if it is moved.

As the servo disk 10 is rotated, all the transitions are moved in the direction of arrow 11. When a positive transition moves across the servo head 20, the servo head 20 generates positive pulse. Conversely, when a negative transition moves across the servo head 20, the servo head 20 generates a negative pulse. These two pulses constitute a servo signal.

Figure 3A:
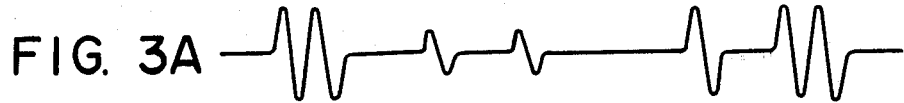
FIGS. 3A to 3H show the waveforms of servo signals which a servo head reads at various positions from the servo track shown in FIG. 1.
Figure 3B:
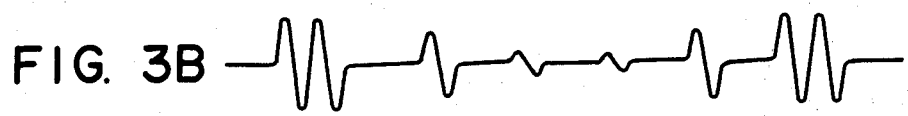
Figure 3C:
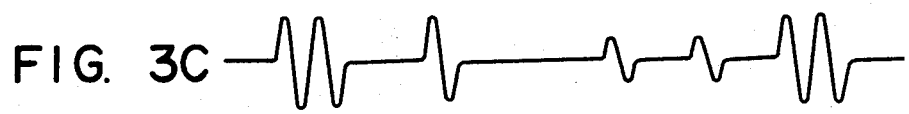
Figure 3D:
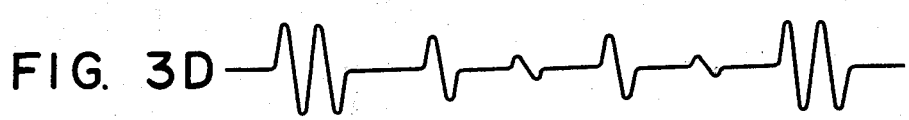
Figure 3E:
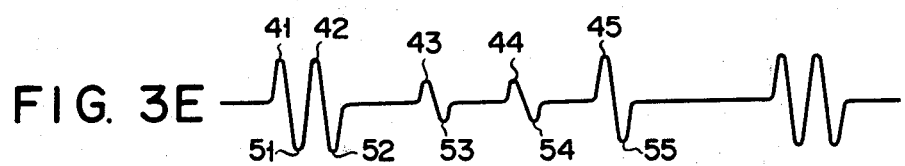

FIGS. 3A to 3H show the waveforms of servo signals which the servo head 20 generates when it is located in various positions relative to the eight positions designated a to h (see FIG. 2). For example, if the servo head 20 is centered on position e, i.e. the border line between tracks $T_1$ and $T_2$, it generates the servo signal shown in FIG. 3E. Thus, the servo head 20 fully overlaps both tracks $T_1$ and $T_2$ because its core is twice as broad as each track. When transitions $C_{+1}$ and $C_{+2}$ simultaneously pass by the servo head 20 at time $t_1$, a positive pulse 41 occurs in the servo signal as shown in FIG. 3E. At time $t_2$, transitions $C_{-1}$ and $C_{-2}$ pass by the servo head 20, and the servo head 20 generates a negative pulse 51. Similarly, when transitions $D_{+1}$ and $D_{+2}$ pass by the servo head 20 at time $t_3$, a positive pulse 42 is generated, and when transitions $D_{-1}$ and $D_{-2}$ pass by the servo head 20 at time $t_4$, a negative pulse 52 is generated. That is pulses 41, 42, 51 and 52 are generated when two transitions of the same polarity pass by the servo head 20 at the same time. Their peak voltages have the same absolute value of V. At time $t_5$, transitions $R_{+01}$ on track $T_1$ passes by the servo head 20, whereby the servo head 20 produces a positive pulse 43. The absolute peak voltage value of pulse 43 is V/2 since no transition on track $T_2$ passes by the servo head 20 at time $t_5$. Likewise, a negative pulse 53 is generated when transition $R_{-01}$ on track $T_1$ passes by the servo head 20 at time $t_6$. A positive pulse 44 and a negative pulse 54 are generated when transitions $R_{-20}$ and $R_{-20}$ on track $T_2$ pass by the servo head 20 at time $t_7$ and time $t_8$, respectively. Pulses 53, 44 and 54 have an absolute peak voltage value of V/2. When transitions $R_{+10}$ and $R_{+11}$ pass by the servo head 20 at time $t_9$, a positive pulse 45 having an absolute peak voltage value of V is generated. Then, when transitions $R_{-10}$ and $R_{-11}$ pass by the servo head 20 at time $t_{10}$, a negative pulse 55 having an absolute peak voltage value of V is produced. All these pulses are repeatedly generated as illustrated in FIG. 3E so long as the servo head 20 is centered on position e.

Figure 3F:
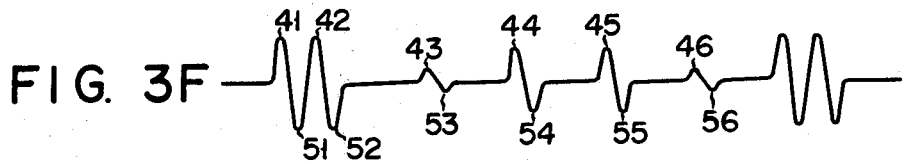
Figure 3G:
Figure 3H:
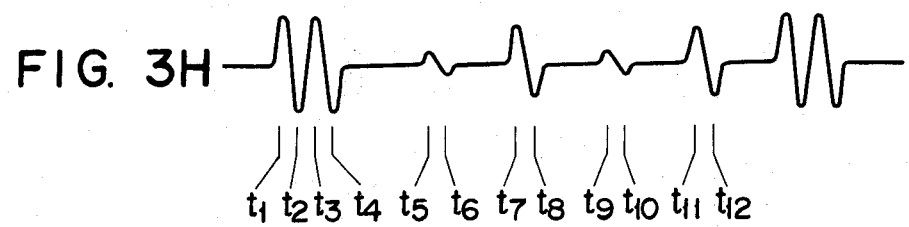

If the servo head 20 is centered on position f, i.e. the center line of track $T_2$, it generates the servo signal shown in FIG. 3F. Thus, the servo head 20 fully overlaps track $T_2$ and the half width of tracks $T_1$ and $T_3$. When three transitions $C_{+1}$, $C_{+2}$ and $C_{+3}$ pass by the servo head 20 simultaneously at time $t_1$, a positive pulse 41″ occurs in the servo signal as shown in FIG. 3F. At time $t_2$ transitions $C_{-1}$, $C_{-2}$ and $C_{-3}$ pass by the servo head 20, and a negative pulse 51′ is generated. Similarly, when transitions $D_{+1}$, $D_{+2}$ and $D_{+3}$ pass by the servo head 20 at time $t_3$, a positive pulse 42′ is generated, and when transitions $D_{-1}$, $D_{-2}$ and $D_{-3}$ pass by the servo head 20 at time $t_4$, a negative pulse 52′ is generated. As in the servo signal shown in FIG. 3E, pulses 41′, 42′, 51′ and 52′ have the same absolute peak voltage value of V. At time $t_5$, transition $R_{+01}$ on track $T_1$ pass by the servo head 20, whereby the servo head 20 produces a positive pulse 43′. The absolute peak voltage value of pulse 43′ is V/4 since no transitions on tracks $T_2$ and $T_3$ pass by the servo head 20 at time $t_5$. Likewise, at time $t_6$ there is generated a negative pulse 53′ having an absolute peak voltage value of V/4 when transition $R_{-01}$ on track $T_1$ passes by the servo head 20. When transitions $R_{+20}$ and $R_{+21}$ on tracks $T_2$ and $T_3$ simultaneously pass by the servo head 20 at time $t_7$, a positive pulse 44′ is generated. The absolute peak voltage value of the pulse 44′ is 3V/4 since the servo head 20 overlaps the entire width of track $T_2$ and half the width of tracks $T_1$ and $T_3$. Similarly, a negative pulse 54′ having an absolute peak voltage value of 3V/4 is generated when transitions $R_{-20}$ and $R_{-21}$ pass by the servo head 20 at time $t_8$. A positive pulse 45′ and a negative pulse 55′, both having an absolute peak voltage value of 3V/4 occur when transitions $R_{+10}$ and $R_{+11}$ pass by the servo head 20 at time $t_9$ and when transitions $R_{-10}$ and $R_{-11}$ pass by the servo head 20 at time $t_{10}$, respectively. At time $t_{11}$, only transition $R_{+30}$ on track $T_3$ passes by the servo head 20, and a positive pulse 46′ occurs. The absolute peak voltage value of pulse 46′ is V/4 since the servo head 20 overlaps half the width of track $T_3$. Then, at time $t_{12}$, only transition $R_{-30}$ on track $T_3$ passes the servo head 20, and the servo head 20 generates a negative pulse 46′ which has an absolute peak voltage value of V/4. All these pulses are repeatedly generated as illustrated in FIG. 3F so long as the servo head 20 is centered on position f.

If the servo head 20 is centered on positions a, b, c and d, it generates the servo signals shown in FIGS. 3A, 3B, 3C and 3D, respectively, in the same manner as mentioned above. Similarly, if it is centered on positions g and h, it generates the servo signals shown in FIGS. 3G and 3H, respectively.

As FIGS. 3A to 3H show, the initial four pulses such as 41, 42, 51 and 52 (FIG. 3E) have the same absolute peak voltage value of V, whatever position the servo head 20 is centered on. In contrast, the absolute peak voltage values of subsequent pulses such as 43′, 44′, 45′, 46′, 53′, 54′, 55′ and 56′ change according to the position of the servo head 20.

Now referring to FIG. 4, a demodulator 70 which cooperates with the servo track configuration of FIGS. 1 and 2 will be described. The demodulator 70 is provided with a separation clock generator 71 and four peak detectors 72, 73, 74 and 75. The servo signal from the servo head 20 is supplied to the separation clock generator 71 and the peak detectors 72, 73, 74 and 75. The peak detectors 72, 73, 74 and 75 detect the peak voltages of the pulses generated at times $T_5$, $T_7$, $T_9$, and $T_{11}$, e.g., pulses 43′, 44′, 45′, and 46′, respectively. The separation clock generator 71 operates in synchronism with pulse 42, 51 or 52 in the servo signal and generates clock signals, which are supplied to the peak detectors 72, 73, 74 and 75 and cause the same to achieve the above-mentioned detection of peak voltages.

The output signals of the peak detectors 72 and 73 are supplied to a differential amplifier 76. The amplifier 76 generates an output signal E having a voltage proportional to the difference between the peak voltages of the pulses generated at times $T_5$ and $T_7$, e.g., pulses 43' and 44'. The output signals of the peak detectors 74 and 75 are supplied to a differential amplifier 77. The amplifier 77 generates an output signal G having a voltage proportional to the difference between the peak voltages of the pulses generated at times $T_9$ and $T_{11}$, e.g., pulses 45' and 46'. The output signal E of the differential amplifier 76 is supplied to an inverting amplifier 78 and also to an analog multiplexer 80. Upon receipt of an output signal from the differential amplifier 76, the inverting amplifier 78 produces an output signal of the opposite polarity. The output signal G of the differential amplifier 77 is supplied to a comparator 79. The comparator generates an output signal of high level when the output signal of the amplifier 77 is positive and an output signal of low level when the output signal of the amplifier 77 is negative.

The analog multiplexer 80 therefore receives the output signal from the differential amplifier 76, the output signal from the inverting amplifier 78, and the output signal from the comparator 79. The analog multiplexer 80 delivers at its output terminal the output signal of the differential amplifier 76 when the output from the comparator 79 is at the low level and multiplexer 80 passes the output signal from the inverting amplifier 78 when the output signal from the comparator 79 is at the high level. The output signal of the multiplexer 80 is supplied to a differentiator 81, which generates an output signal J having a voltage proportional to the amplitude rate of change of the output signal from the analog multiplexer 80.

With reference to FIGS. 5A to 5I, the relationship between the position of the servo head 20 and the voltage of the output signals of the elements constituting the above-described demodulator will be described.

Figure 5A:
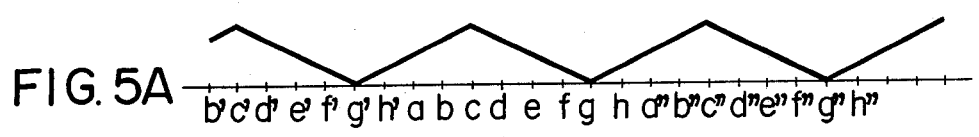
Figure 5B:
Figure 5C:
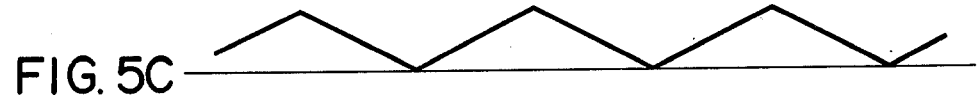
Figure 5D:
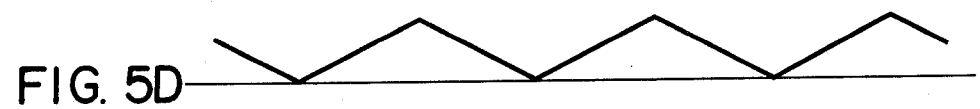

The voltage of the output signal of the peak detector 72, e.g. the peak voltage of pulse 43' shown in FIG. 3F, has such relationship with the position of the servo head 20 as illustrated in FIG. 5A. The voltage of the output signal of the peak detector 73, e.g., the peak voltage of pulse 44' shown in FIG. 3F, has such relationship with the position of the servo head 20 as illustrated in FIG. 5B. The voltage of the output signal of the peak detector 74, e.g., the peak voltage of pulse 45' shown in FIG. 3F, has such relationship with the position of the servo head 20 as shown in FIG. 5C. The voltage of the output signal of the peak detector 75, e.g., the peak voltage of pulse 46' shown in FIG. 3F, has such relationship with the position of the servo head 20 as illustrated in FIG. 5D. As FIGS. 5A and 5B show, the output signals of the peak detectors 72 and 73 have a phase difference of 180°. Similarly, as FIGS. 5C and 5D show, the output signals of the peak detectors 74 and 75 have a phase difference of 180°. Further, as shown in FIGS. 5A and 5C, the output signals of the peak detectors 72 and 74 have a phase difference of 90°.

Figure 5E:
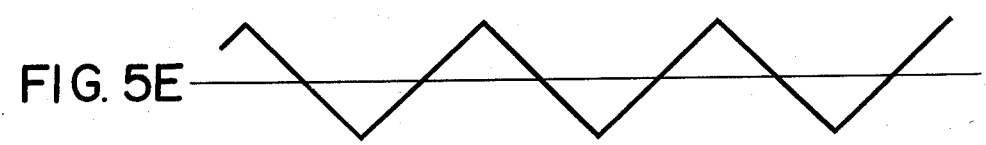
Figure 5F:
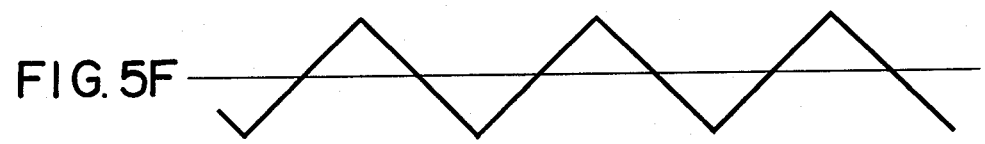
Figure 5G:
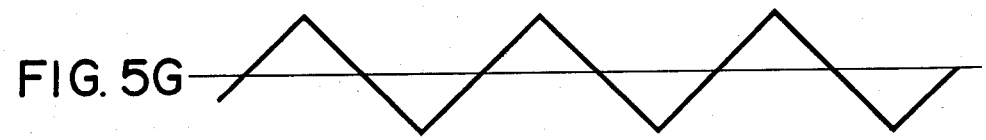
Figure 5I:
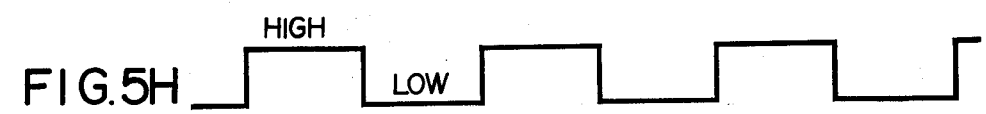
Figure 5I:
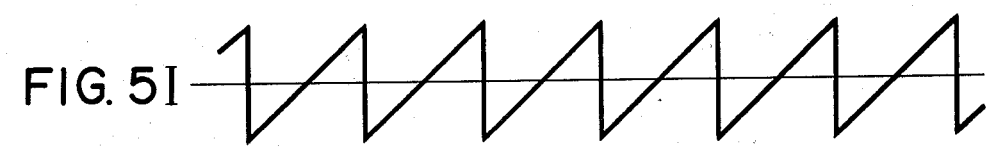

The voltage of the output signal of the differential amplifier 76 has such relationship with the position of the servo head 20 as illustrated in FIG. 5E. The voltage of the output signal of the inverting amplifier 78 has such relationship with the position of the servo head 20 as shown in FIG. 5F. The voltage of the output signal of the differential amplifier 77 has such relationship with the position of the servo head 20 as shown in FIG. 5G. As FIGS. 5E and 5G show, the output signals of the differential amplifiers 76 and 77 have the same waveform and a phase difference of 90°. The voltage of the output signal of the comparator 79 has such relationship with the position of the servo head 20 as illustrated in FIG. 5H. The voltage of the output signal of the analog multiplexer 80 has such relationship with the position of the servo head 20 as illustrated in FIG. 5I. As Fig. 5I shows, the output of the multiplexer 80 indicates the position of the servo head 20.

Figure 6I:
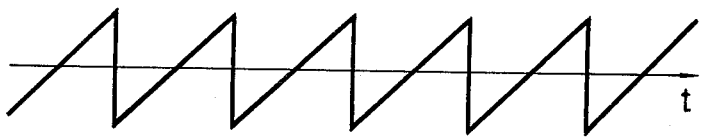
FIGS. 6I and 6J, FIGS. 7I and 7J and FIGS. 8I and 8J show the waveforms of the output signal of the demodulator when the servo head moves with different speeds and in different directions.
Figure 6J:
Figure 7I:
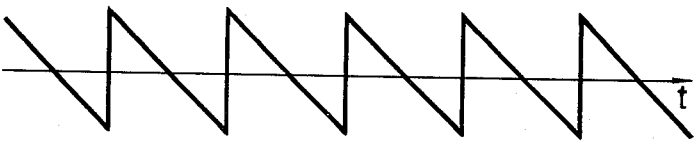
Figure 7J:
Figure 8I:
Figure 8J:
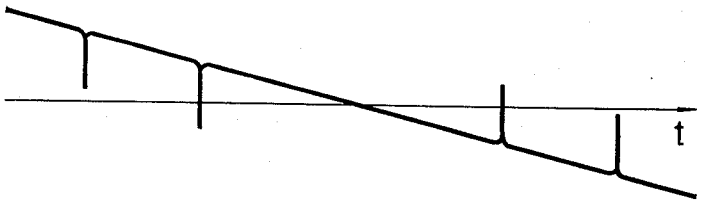
Figure 9:
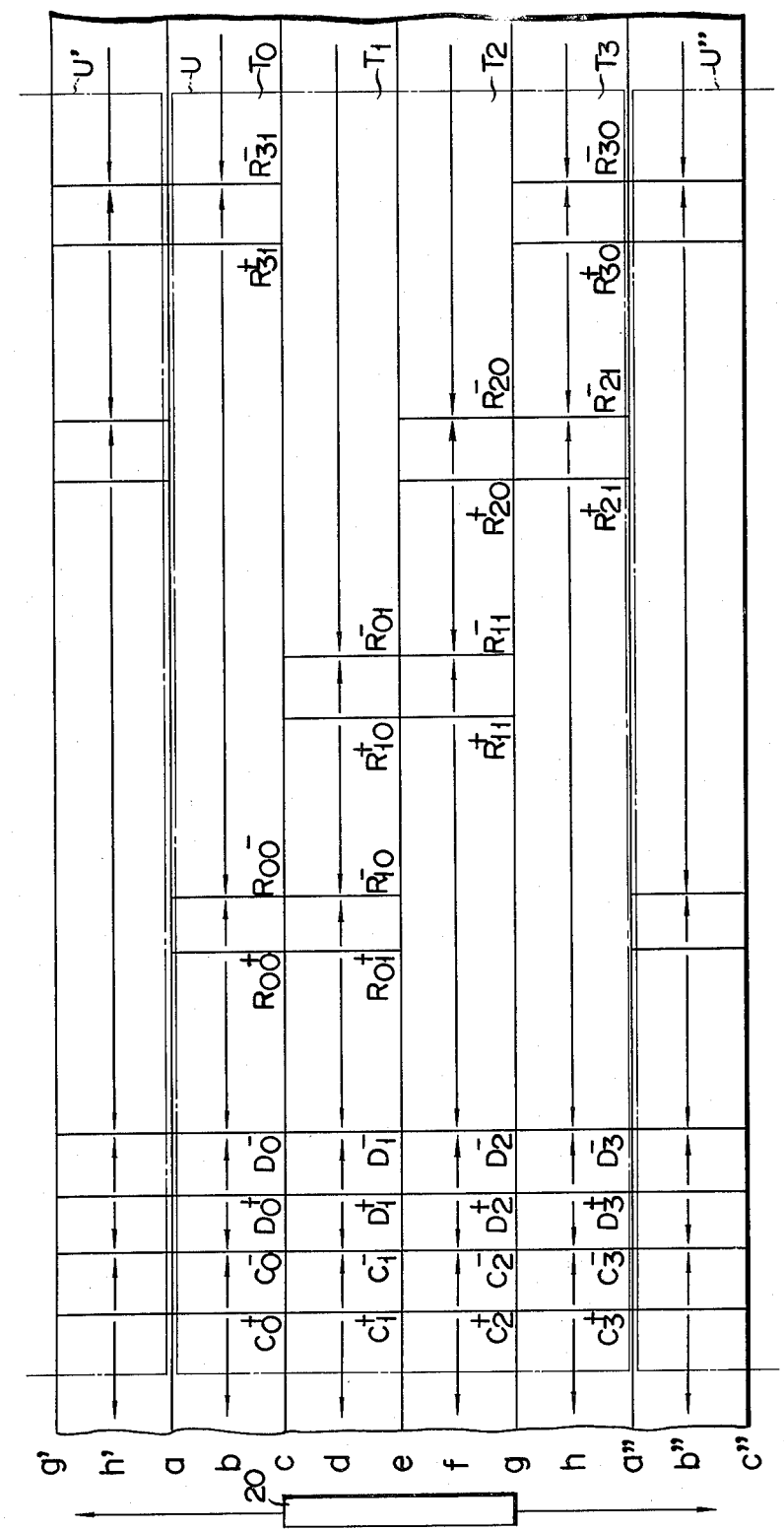

FIGS. 6I and 6J show how the output signals of the multiplexer 80 and differentiator 81 change as the servo head 20 moves at a constant speed in the direction of arrow 21 in FIG. 2. FIGS. 7I and 7J show how the output signals of the multiplexer 80 and differentiator 81 change as the servo head 20 moves at a constant speed in the direction of arrow 22 in FIG. 2. FIGS. 8I and 8J illustrate how the output signals of the multiplexer 80 and differentiator 81 change as the servo head 20 moves in the direction of arrow 21 in FIG. 2 and then in the direction of arrow 22 in FIG. 2. As FIGS. 6I, 6J, 7I, 7J, 8I and 8J show, the polarity of the output signal of the differentiator 81 represents the direction in which the servo head 20 moves, and its voltage indicates the speed with which the servo head 20 moves. Spike noise contained in the output signal of the differentiator 81 can be removed by an appropriate lowpass filter.

Figure 4:
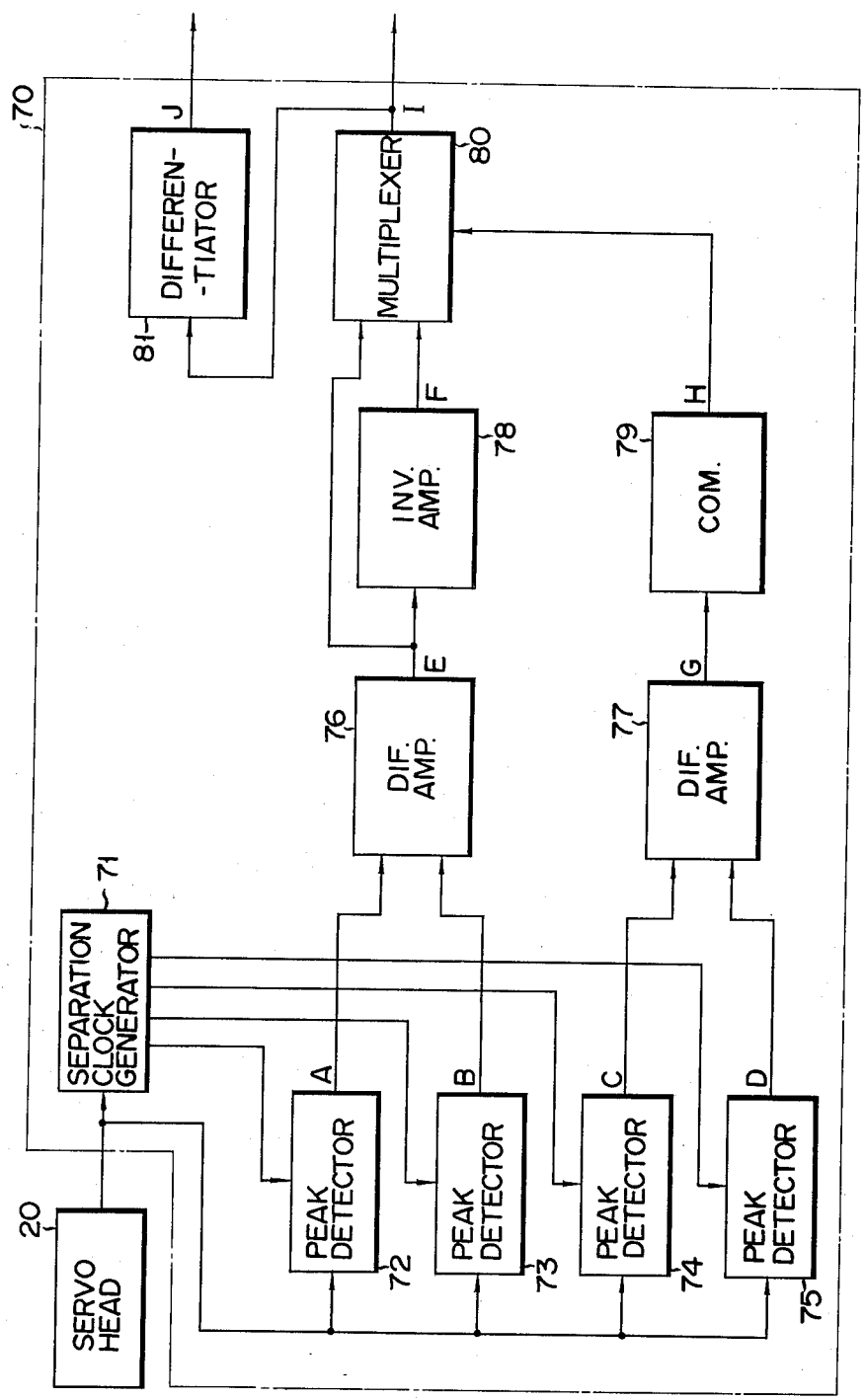
FIG. 4 is a block circuit diagram of a demodulator which cooperates with the servo track configuration shown in FIG. 1.

As described above, the servo track apparatus according to this invention, including the associated demodulator as shown in FIG. 4, can provide first servo information indicating the position of a servo head and second servo information indicating both velocity and direction in which the servo head is moving.

Figure 10:
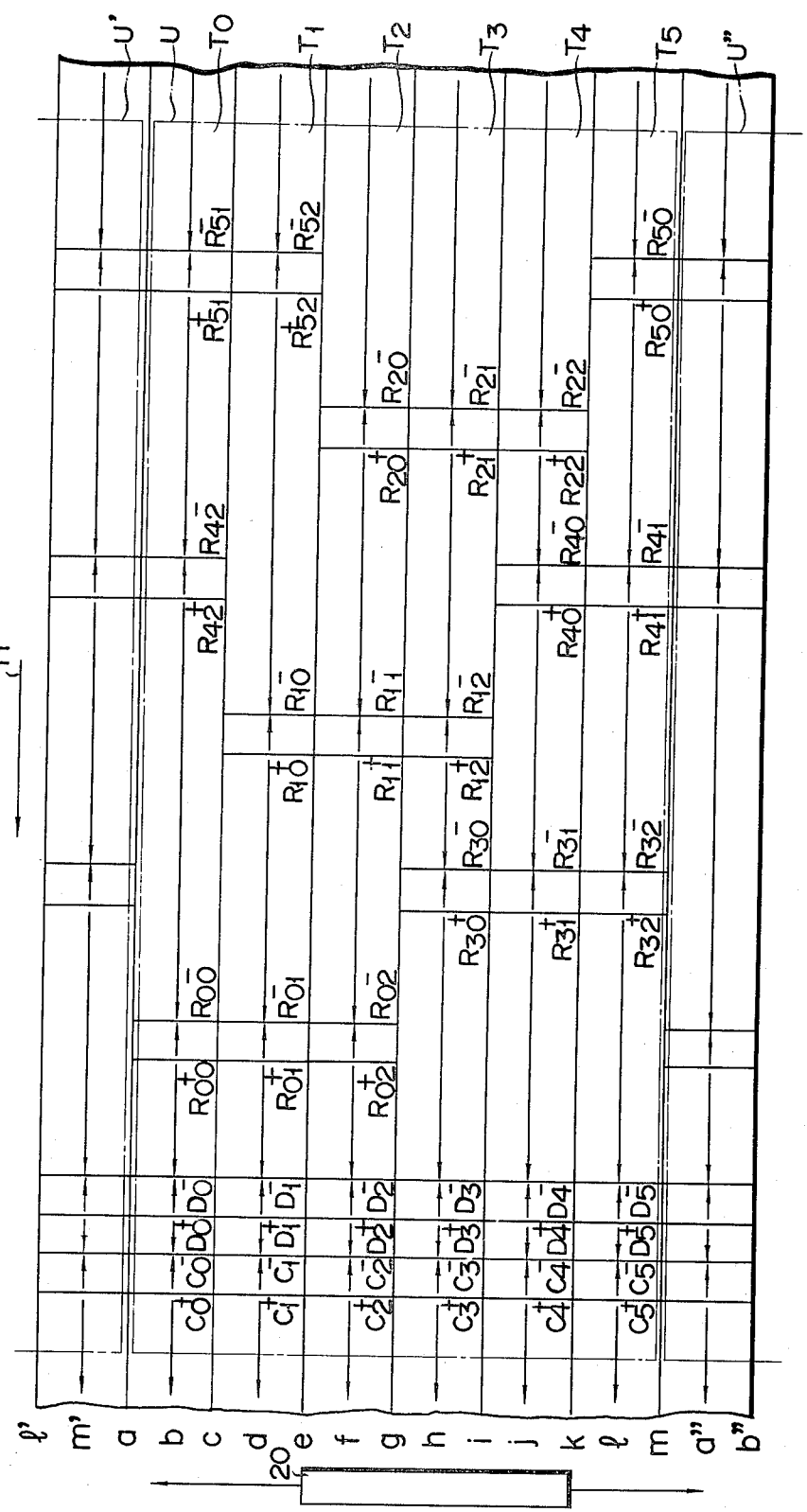

Besides the above-described embodiment, various additional embodiments are possible within the scope of this invention. For example, transitions may be arranged in any different order. Further, each unit pattern area may include more than four servo tracks, e.g. six servo tracks, eight servo tracks and ten servo tracks. Still further, it is not required that a positive transition and a negative transition should be arranged to form a pair as in the embodiment shown in FIG. 1. Some of such embodiments are illustrated in FIGS. 10 and 11.

What we claim is:

1. A servo track configuration comprising at least one unit pattern area including $2n$ ($n=2, 3, 4, \ldots$) servo tracks $T_i$ ($i=0, 1, \ldots 2n-1$) and $2n^2$ flux transitions $R_{jk}$ ($j=0, 1, \ldots 2n-1$; $k=0, 1, \ldots n-1$) satisfying the following four conditions:

Condition TT: track $T_p$ being adjacent to track $T_{p+1}$;

Condition TR: transition $R_{pq}$ occurring on track $T_{p+q}$ (mod $2n$);

Condition RR: transition $R_{pq}$ and transition $R_{pr}$ ($r \neq q$) having the same polarity and occurring at the same position; and Condition $\overline{RR}$: transition $R_{pr}$ and transition $R_{qr}$ ($q \neq p$) occurring at different positions.

2. A servo track configuration according to claim 1, wherein said unit pattern area further includes n transitions $C_l$ ($l=0, 1, \ldots 2n-1$) satisfying the following conditions:

Condition TC: transition $C_p$ occurring on track $T_p$; and

Condition CC: transition $C_p$ and transition $C_q$ ($q \neq p$) having the same polarity and occurring at the same position.

3. A servo track configuration according to claim 2, wherein said unit pattern area is repetitive along tracks.

4. A servo track configuration according to claim 3, wherein said unit pattern area is repetitive across tracks.

5. A servo track configuration according to claim 4, wherein said track $T_p$ and track $T_q$ ($q \neq p$) have the same width.

* * * * *

UNITED STATES PATENT AND TRADEMARK OFFICE
CERTIFICATE OF CORRECTION

PATENT NO. : 4,238,809
DATED : December 9, 1980
INVENTOR(S) : Masao Fujiki et al It is certified that error appears in the above–identified patent and that said Letters Patent are hereby corrected as shown below:

IN THE ABSTRACT:

Second line from the bottom, "$\overline{RR}$" should read --$\overline{RR}$--.

Signed and Sealed this

Eighth Day of September 1981

[SEAL]

Attest:

GERALD J. MOSSINGHOFF

Attesting Officer     Commissioner of Patents and Trademarks